Figure 1:
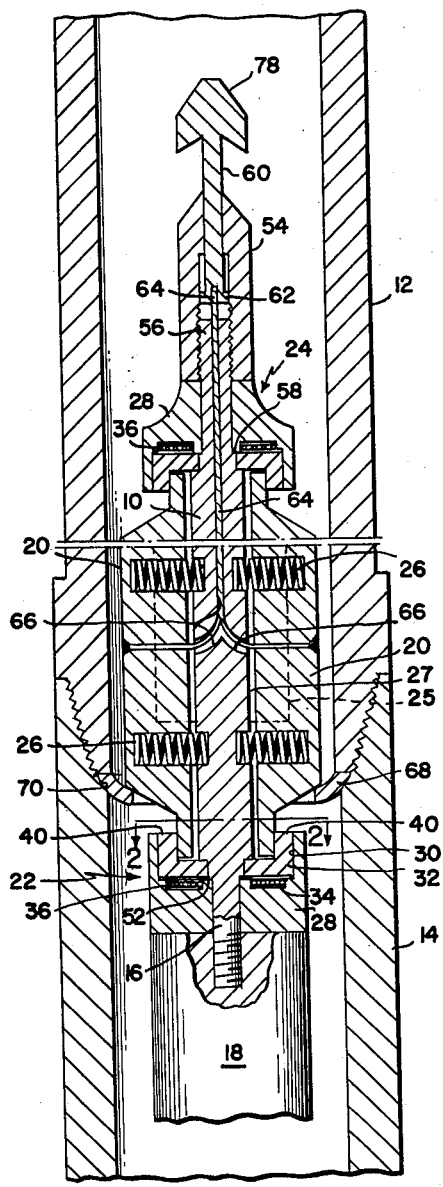

INVENTOR.
JOHN D. BENNETT
BY
ATTORNEYS

Feb. 26, 1963  J. D. BENNETT  3,078,922
APPARATUS FOR CONTROLLING THE MOVEMENT OF
A TOOL THROUGH A TUBULAR STRUCTURE
Filed April 18, 1960  2 Sheets-Sheet 2

*INVENTOR.*
JOHN D. BENNETT
BY
ATTORNEYS

United States Patent Office 3,078,922
Patented Feb. 26, 1963

3,078,922
APPARATUS FOR CONTROLLING THE MOVEMENT OF A TOOL THROUGH A TUBULAR STRUCTURE
John D. Bennett, Richardson, Tex., assignor to Sun Oil Company, Philadelphia, Pa., a corporation of New Jersey
Filed Apr. 18, 1960, Ser. No. 22,996
12 Claims. (Cl. 166—214)

This invention relates generally to apparatus for controlling the movement of a tool such as those used in well drilling, through a pipe, which may be a drill pipe, tubing or a well casing. More specifically, the invention is directed to apparatus for controlling the lowering of a bore hole logging apparatus in a drill pipe.

In well logging operations it is desirable to be able to move a tool, such as a logging instrument, to a predetermined location, make it perform a function, and then be able to retrieve the tool. One mode of operation particularly desirable in well logging, is to lower the logging apparatus through the drill pipe without any retardation until reaching a predetermined point just before the final resting position at which point the remainder of the downward movement of a logging apparatus is to be retarded. This mode of operation may be employed so as to insure that a flexible wand structure mounted at the lower end of the logging apparatus will not bend or collapse and will move into a jet opening in the drill bit at the lower end of the drill stem. For a further description of the logging apparatus requiring the above-discussed mode of operation, reference is made to the application of Bennett, Chaney, Jones and Mayes, Serial No. 818,162, filed June 4, 1959.

In accordance with one form of the present invention, an apparatus is provided which may be connected to a logging means and comprises a control means engageable with the drill stem through which the apparatus is to be lowered for retarding the descent of the logging means. This retarding means is held in an inoperative retracted position during the initial descent through the drill stem. A tripping means is provided within the drill stem immediately above the location at which the retarded descent is desired. The tripping means serves to initiate a releasing movement of the apparatus whereby the retarding means is moved to the extended control position in engagement with the drill stem to thereby retard the descent of the logging apparatus. Means are also provided for retracting the control means during the return movement of the apparatus whereby there is no retardation to this movement.

In well drilling operations, it is also desirable to be able to move a tool through a drill pipe or well casing, to lock the tool at a desired location and to remove the tool from the locked position after it has performed its function. In accordance with a second form of the invention, the apparatus which is connected to the tool comprises a projection which is formed on the control means. This projection is cooperable with a recess in the drill stem or well casing to lock the tool in the desired position after the control means is actuated to its extended position by a tripping collar. The tripping collar is thus located within the drill stem or well casing immediately above the positioning recess.

The general object of the present invention is the provision of apparatus for controlling the movement of a tool through a tube, such as a drill stem or well casing, in accordance with the above-discussed modes of operation.

Figure 6:
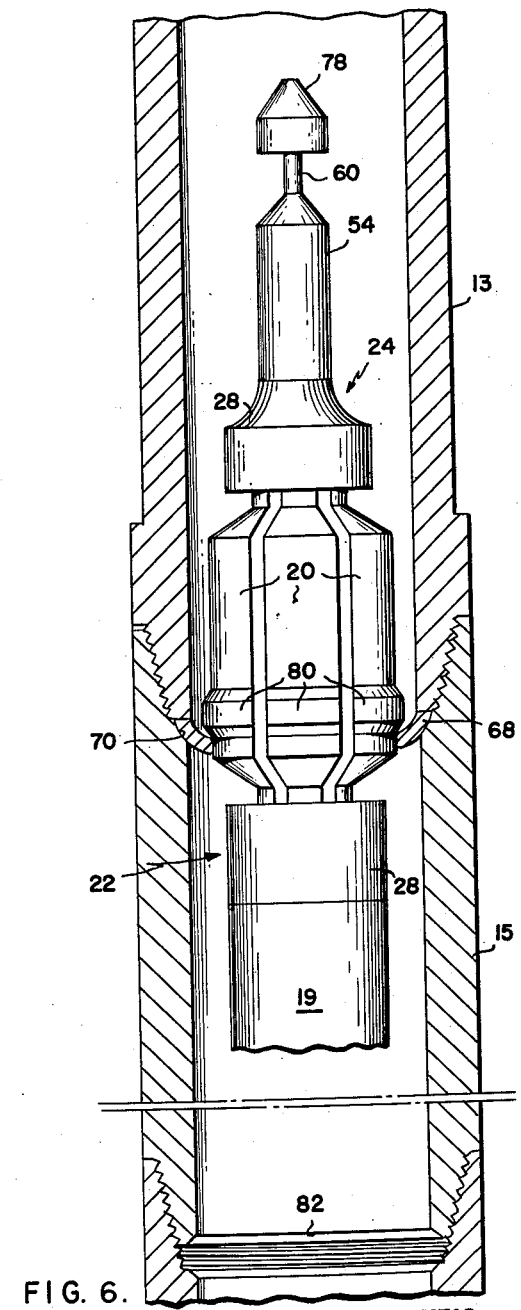
Figure 2:
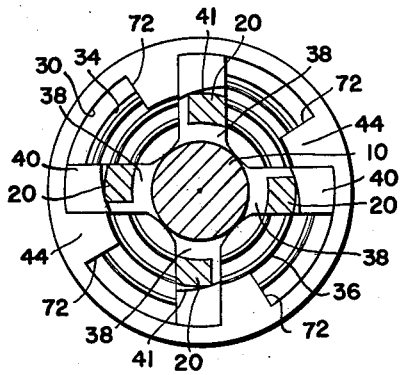
Figure 3:
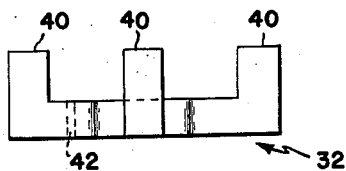
Figure 4:
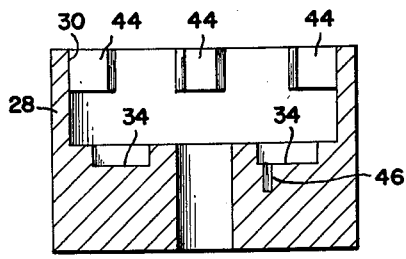
Figure 5:
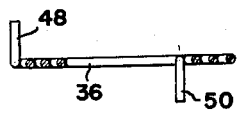

The above and other objects of the invention may be more easily appreciated from a consideration of the following disclosure in conjunction with the accompanying drawing wherein:

FIGURE 1 is an axial sectional view of a drill pipe having apparatus in accordance with the present invention therein;
FIGURE 2 is an enlarged sectional view taken on line 2—2 of FIGURE 1;
FIGURE 3 is an elevational view of the spider member shown in FIGURE 2;
FIGURE 4 is a sectional view of the collar shown in FIGURE 2;
FIGURE 5 is an elevational view of the spiral spring shown in FIGURE 2; and
FIGURE 6 is an axial sectional view of a drill pipe showing a modified form of the invention.

A preferred form of apparatus constructed in accordance with the invention comprises a member 10 extending axially within a vertically extending drill pipe 12 joined with a drill collar 14. Member 10 has a reduced diameter portion 16 at the lower end thereof threadedly connected to a tool member 18 which may be of various types, as, for example, a logging apparatus.

A plurality of elongated drag shoes 20, preferably four in number, are mounted on member 10 by a pair of retainers 22 and 24 secured to shaft member 10 at the opposite ends of shoes 20. An enlarged diameter portion 25 of member 10 has radially extending slots 27, adapted to slidably receive shoes 20, which are guided by portion 25 for movement radially inwardly and outwardly. Shoes 20 are urged outwardly by coil springs 26 distributed along their length and mounted in compression between member 10 and shoes 20.

Retainers 22 and 24 are similar so that only one of them will be described in detail, it being noted that like reference numerals are used to indicate the corresponding parts thereof. Retainer 22 comprises a collar 28 which is secured to member 10 and which has a cylindrical recess 30 adapted to receive a spider member 32 and an annular recess 34 adapted to receive a spiral spring 36. Spider member 32 is rotatably mounted on member 10 and has four arms 38 which extend radially from a central portion thereof and have turned ends 40. The inner wall 41 of each of the turned ends 40 has a slight eccentric shape as shown in FIGURE 2 for a purpose to be more fully described hereinafter. A bore 42 passes through one of the arms 38. Collar 28 has four stops 44 extending into recess 30 and a small axially extending bore 46 joining with annular recess 34. Spiral spring 36 has turned ends 48 and 50 extending in opposite directions.

When retainer 22 is assembled, spiral spring 36 is positioned in recess 34 with turned end 50 extending into bore 46 and spider member 32 is positioned within recess 30 with the turned end 48 of the spiral spring 46 extending into bore 42. Spring 36 biases spider member 32 in a clockwise direction as viewed in FIGURE 2.

Retainer 22 is fixedly mounted on shaft member 10 by the tool member 18 which is threaded onto reduced diameter portion 16 so as to force collar 28 against a shoulder 52 and by keying collar 28 to portion 16 to prevent rotation thereof. Retainer 24 is mounted on shaft member 10 by a hollow sleeve member 54 threaded onto the upper end 56 of member 10 so as to force collar 28 of retainer 24 against a shoulder 58 on shaft member 10. The collar 28 of retainer 24 is keyed to end 56 of member 10 to prevent rotation of collar 28.

Means are provided for retracting the shoes 20 and such means comprises a rod 60 extending through an opening in the closed upper end of the sleeve member 54. Rod 60 has a flange 62 at the inner end thereof and is slidable in sleeve member 54, the upward movement of rod 60 being limited by engagement of flange 62 with the upper end of sleeve member 54. A flexible cable 64 extends through passageways 66 in shaft member 10 for connection with the inner end of rod 60 and each of the shoes 20. Upward movement of rod 60 will thus be transmitted into radially inward movement of shoe 20 by means of cable 64.

A tripping collar 68 may be positioned at any predetermined position within the tubular structure as, for example, between the joint of drill pipe 12 and drill collar 14. Tripping collar 68 is an annular structure adapted to be received at its outer periphery in a recess 70 formed between drill pipe 12 and drill collar 14. Tripping collar 68 is constructed with an inner diameter less than the outer diameter of the shoes 20 when they are in the retracted position whereby drill collar 68 engages all of the shoes 20 to move the same radially inwardly as they pass downwardly through the tripping collar 68.

When it is desired to lower the tool member 18 through the drill pipe, the assembled apparatus is moved to the position shown in FIGURES 1 and 2 with the shoes 20 retracted. To place the parts in this position the shoes 20 are moved radially inwardly, as by pulling on rod 60, and the spider member 32 is rotated against its bias to the position in which the turned ends 40 are in radial alignment with the ends of drag shoes 20 as shown in FIGURE 2. The retracting force on shoes 20 is then released and springs 26 force shoes 20 radially outwardly into engagement with the eccentric inner walls 41 of the turned ends 40 of spider member 32 at a location slightly spaced from the high portion of the eccentric. This engagement between the shoes 20 and the spider member 32 prevents rotation of the latter in accordance with its bias by reason of the interference provided by the shoes 20 engaging the eccentric inner walls 41 to restrict movement of the ends 40. This interference to rotation of spider member 32 in a clockwise direction, as viewed in FIGURE 2, is greater than the bias of spring 36 tending to cause such rotation. Shoes 20 are movable from the retracted position shown in FIGURES 1 and 2 radially outwardly to a position into which shoes 20 engage the walls of recess 30 in collar 28. However, with the apparatus in the assembled position, the engagement between shoes 20 and turned ends 40 of spider member 32 effectively prevents such outward movement.

It is thus apparent that the tool member 18 may be dropped through the drill pipe 12, which may have a smaller internal diameter than the drill collar 14, without the drag shoes 20 retarding the downward movement as long as the shoes are not released from their retracted position. In order to effect release of the shoes 20, it is necessary to move all of the shoes 20 inwardly out of contact with the eccentric inner walls 41 so that the spider member 32 may rotate out of the position in which turned ends 40 restrict outward movement of the shoes 20 into a non-restricting position. As long as at least one of the shoes 20 is in engagement with a corresponding inner wall 41 of a turned end 40, the spider member 32 will not be released. It will thus be noted that the bumping of the apparatus against the walls of the tubular structure as the apparatus descends will not effect release of the shoes 20 since there will always remain at least one of the shoes 20 which will not be moved inwardly as result of a bumping movement by the apparatus.

When the apparatus reaches the tripping collar 68, all of the shoes 20 will be cammed inwardly at the same time by engagement with the tripping collar 68. As shown in FIGURE 2, inward movement of the shoes 20 will remove the interference between the ends of shoes 20 and the eccentric inner walls 41 of spider member 32 which will rotate in a clockwise direction under the bias of spiral spring 36 until turned ends 40 engage the sides 72 of stops 44. After passing completely through tripping collar 68, the shoes 20 will move radially outwardly into engagement with drill collar 14 to thereby retard the downward movement of the assembly including tool member 18. This outward movement is possible since the ends 40 are no longer in a position of radial alignment with ends of shoes 20. The movement of the apparatus downwardly through the drill collar 14 is retarded by the frictional contact of shoes 20 with the inner wall of the drill collar 14.

After the tool member 18 has reached its final position and it is desired to retrieve the same, as, for example, after the logging operation, a lifting force is applied to the spearhead 78 of rod 60 which is moved upwardly within sleeve member 54. This lifting force may be applied by an overshot which grasps spearhead 78. This movement of rod 60 will cause retraction of shoes 20 through the action of cable 64. When flange 62 engages the upper end of sleeve member 54, the tool member 18 will be actuated upwardly by a continued upward movement of the overshot engaging spearhead 78. In this manner the member 18 may be removed from the drill stem. It will be apparent that as the shoes 20 are moved upwardly, by reason of their retracted condition there will be a minimum of frictional contact with the walls of the drill stem and the tripping collar. This is desirable since there should be a minimum of resistance to the withdrawal of the logging apparatus.

The form of the invention shown in FIGURE 6 may be used whenever it is desired to position a tool within a drill stem, as for example in core sampling, or within a well casing or other similar pipes. In this use, there is no need for the shoes to serve as movement retarding means although the shoes could serve in this capacity in order to slow down the descent of the apparatus to insure the proper positioning thereof. For purposes of positioning the apparatus, the shoes 20 have a projection 80 extending radially outwardly therefrom. The tubular structure in which the apparatus is to be positioned has a tripping collar 68 mounted in the recess 70 formed between the joint of two casing structures 13 and 15. Collar 68 is positioned immediately above the recess 82 which is to be utilized to position the tool 19 carried by the apparatus.

The apparatus is assembled in the manner discussed with respect to the FIGURE 1 structure with the shoes 20 in the retracted position and is then dropped down through the tubular structure. The apparatus falls freely since the shoes 20 are retracted and will pass all of the recesses formed at pipe joints above the tripping collar 68. After passing the tripping collar 68, the shoes 20 move radially outwardly. Thus, when the apparatus descends to the recess 82, which is immediately below the tripping collar 68, the projections 80 will enter the recess 82 to arrest further descent and position the tool at the desired location.

When it is desired to retrieve the tool 19, an overshot is lowered to engage the spearhead 78. When the lifting force is applied to the spearhead 78, the shoes 20 are retracted whereby the projections 80 are removed from recess 82 and the apparatus may be raised without interference by the shoes 20.

It is apparent that the FIGURE 2 apparatus may be used to position a tool at any of a plurality of locations within a pipe by simply placing a tripping collar immediately above the desired location. It is also to be noted that although the disclosure of the apparatus shown in FIGURE 2 is directed to the usefulness in a vertical pipe, the apparatus in accordance with the present invention may be readily used in a horizontal pipe or may be passed through a horizontal pipe which turns into a vertical pipe.

It will be evident that the features of the invention may be carried out by other apparatus and it is to be understood that the invention is not limited except as required by the following claims.

What is claimed is:

1. Apparatus for controlling the movement of a tool member through an elongated tube comprising, a support member movable through the tube and extending axially thereof, said support member having one end secured to the tool member, means for retarding movement of said support member through the tube, said retarding means being mounted on said support member for movement radially thereof between a retracted inoperative position and an extended retarding position, means biasing said retarding means toward said extended retarding position, means movably mounted on said support means and engageable with said retarding means to restrict the same in said retracted inoperative position, and means including a tripping means within said tube and contactable by said retarding means for actuating said restricting means out of engagement with said retarding means to release said retarding means for movement into said retarding position for controlling the movement of the tool member.

2. Apparatus as claimed in claim 1 including means connected to said retarding means for actuating the retarding means from said retarding position to said inoperative position during a return movement of said support member through the tube.

3. Apparatus for controlling the movement of a tool member through an elongated tube comprising a support means movable through the tube and having a tool member mounted at one end thereof, means for retarding movement of said support means through the tube, said retarding means being mounted on said support means for movement radially thereof between a retracted inoperative position and an extended movement retarding position, means biasing said retarding means toward said extended retarding position, movable means for restricting the movement of said retarding means from said inoperative position, means biasing said restricting means toward a position releasing said retarding means for movement to said retarding position, said retarding means being engageable with said restricting means when in said inoperative position to hold the restricting means against movement in accordance with the bias thereof, and tripping means within the tube engageable by said retarding means to effect movement thereof out of engagement with said restricting means whereby said restricting means moves to said releasing position.

4. Apparatus as claimed in claim 3 including means operatively connected to said retarding means and movable to actuate said retarding means against the bias thereof to said inoperative position during a return movement of said support means through the tube.

5. Apparatus for controlling the movement of a tool member through a vertically positioned elongated tube comprising a support means movable through the tube and having the tool member mounted at the bottom end thereof, a plurality of drag shoes movably mounted on said support means and biased toward engagement with the tube for retarding movement of said support means through the tube, means movably mounted on said support means for movement between a position in engagement with said shoes for restricting the movement of said shoes into engagement with the tube and a position out of engagement with said shoes for releasing said shoes for movement into engagement with the tube, means biasing said restricting means toward said releasing position thereof, said bias of said shoes urging said shoes into engagement with said restricting means in said restricting position thereof to hold said restricting means in said restricting position against the bias of said restricting means, and tripping means within the tube engageable by said shoes to effect movement thereof out of engagement with said restricting means whereby said restricting means moves to said releasing position.

6. Apparatus for controlling the movement of a tool member through a vertically positioned elongated tube comprising a support means movable through the tube and having the tool member mounted at the bottom end thereof, a plurality of drag shoes movably mounted on said support means, means biasing said shoes radially outwardly toward engagement with the tube for retarding movement of said support means through the tube, means rotatably mounted on said support means for restricting the movement of said shoes toward engagement with the tube in one rotary position, means biasing said rotatably mounted means toward rotation to a position releasing said shoes for movement toward engagement with the tube, said bias of said shoes urging said shoes into engagement with said restricting means in said restricting position thereof to hold said restricting means against rotation in accordance with said bias thereof, and tripping means within the tube engageable by said shoes to effect movement thereof out of engagement with said restricting means whereby said restricting means rotates to said releasing position and said shoes are movable toward engagement with the tube.

7. Apparatus as claimed in claim 6 wherein said tripping means comprises a collar supported on the tube and projecting inwardly thereof, said collar being engageable with said shoes upon movement of said support means past said collar to actuate said shoes inwardly against the bias thereof.

8. Apparatus as claimed in claim 6 including means operatively connected to said shoes and movable to actuate said shoes inwardly to a retracted position out of engagement with the tube to render said shoes inoperative to retard movement of said support means within the tube.

9. Apparatus as claimed in claim 8 wherein said last mentioned means comprises a member movably mounted on said support means and projecting from the upper end thereof for the application of a lifting force thereto, and flexible cable means connecting said projecting member to said shoes whereby upon the application of lifting force to said projection member, said flexible cable means pulls said shoes inwardly to said retracted position thereof.

10. Apparatus as claimed in claim 6 wherein each of said shoes has a projection facing the tube and including a recess in the tube for receiving said projections to stop the downward movement of said support means and the tool member.

11. Apparatus for controlling the movement of a tool member through an elongated tube comprising, a support member movable through the tube and having the tool member mounted at one end thereof, means mounted on said support member for retarding the movement thereof through the tube, means biasing said retarding means toward frictional engagement with the tube, means movably mounted on said support member and engageable by said retarding means to limit said movement of said retarding means, and means including a tripping means within said tube and engageable by said retarding means for actuating said limit means out of engagement with said retarding means whereby said retarding means is movable into engagement with said tube.

12. Apparatus as claimed in claim 11 including means connected to said retarding means for actuating said retarding means out of engagement with the tube to render said retarding means inoperative during a return movement of said support member through the tube.

References Cited in the file of this patent

UNITED STATES PATENTS

| | | |
|---|---|---|
| 2,229,581 | McLaughlin | Jan. 21, 1941 |
| 2,383,453 | Crickmer | Aug. 28, 1945 |
| 2,908,333 | Schwab | Oct. 13, 1959 |
| 2,941,599 | Daffin | June 21, 1960 |
| 2,991,835 | Schwab | July 11, 1961 |